United States Patent
Yoshioka et al.

(10) Patent No.: US 7,457,069 B2
(45) Date of Patent: Nov. 25, 2008

(54) MAGNETIC DISK DRIVE WITH FLYING HEIGHT CONTROL, CONTROL METHOD, AND MANUFACTURING METHOD

(75) Inventors: Masaki Yoshioka, Kanagawa (JP); Akira Kojima, Kanagawa (JP); Toshiyuki Konishi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/372,064

(22) Filed: Mar. 8, 2006

(65) Prior Publication Data
US 2006/0203376 A1    Sep. 14, 2006

(30) Foreign Application Priority Data
Mar. 8, 2005    (JP) .............................. 2005-063419

(51) Int. Cl.
*G11B 21/02* (2006.01)
*G11B 5/596* (2006.01)

(52) U.S. Cl. .................... 360/75; 360/31; 360/78.08; 360/294.7

(58) Field of Classification Search .................. None
See application file for complete search history.

(56) References Cited

U.S. PATENT DOCUMENTS

| | | | |
|---|---|---|---|
| 5,991,113 A * | 11/1999 | Meyer et al. | 360/75 |
| 6,501,606 B2 * | 12/2002 | Boutaghou et al. | 360/25 |
| 6,504,662 B2 * | 1/2003 | Sobey | 360/25 |
| 6,567,229 B1 * | 5/2003 | Mallary et al. | 360/75 |
| 6,757,124 B2 * | 6/2004 | Kelemen | 360/75 |
| 6,798,605 B2 | 9/2004 | Kurita et al. | |
| 2002/0054447 A1 * | 5/2002 | Kurita et al. | 360/75 |

FOREIGN PATENT DOCUMENTS

| | | |
|---|---|---|
| JP | 10-069747 | 3/1998 |
| JP | 10-233070 | 9/1998 |

* cited by examiner

*Primary Examiner*—Joseph Feild
*Assistant Examiner*—Jason Olson
(74) *Attorney, Agent, or Firm*—Townsend and Townsend and Crew LLP; Darren Gold

(57) ABSTRACT

Embodiments of the invention prevent a magnetic head from coming into contact with a protrusion on a magnetic disk. In one embodiment, a head gimbal assembly includes a piezoelectric actuator for changing the flying height of a head/slider assembly. The address of a protrusion on a magnetic disk is preregistered in a nonvolatile memory. When a seek operation or following operation is to be performed, the head/slider assembly flies at a reference flying height. Before the protrusion passes below the head/slider assembly, an operating voltage is applied to the piezoelectric actuator to increase the flying height. After the protrusion passes below the head/slider assembly, the head/slider assembly flies at the reference flying height with operating voltage application stopped.

15 Claims, 13 Drawing Sheets

(A)          (B)

(A)

(B)

(A)

(B)

MAGNETIC DISK DRIVE WITH FLYING HEIGHT CONTROL, CONTROL METHOD, AND MANUFACTURING METHOD

CROSS-REFERENCES TO RELATED APPLICATIONS

This application claims priority from Japanese Patent Application No. JP2005-063419, filed Mar. 8, 2005, the entire disclosure of which is incorporated herein by reference.

BACKGROUND OF THE INVENTION

The present invention relates to a technology for controlling the flying height of a magnetic head in order to prevent the magnetic head from colliding against a protrusion on the surface of a magnetic disk in a magnetic disk drive.

In a magnetic disk drive, a head/slider assembly containing a magnetic head flies slightly above a rotating magnetic disk. The magnetic head is configured as a composite magnetic head, which generally includes an inductive thin-film write head and an MR read head, which employs an MR (magnetoresistive) element. These two heads are formed on a single slider. The clearance between the magnetic head and magnetic disk surface is referred to as a flying height. To provide an increased recording density, it is necessary to minimize the magnetic head flying height to increase the sensitivity for detecting a change in a magnetic field generated by magnetic layer particles or decrease the size of the magnetization pattern to be recorded.

The MR read head detects a resistance change caused by an external magnetic field by reading a voltage that is dependent on a change in the current flowing to the MR element. When an inductive read head is used, a high detection sensitivity can be obtained. In a magnetic disk manufacturing process, it is difficult to make the magnetic disk surface completely flat. Therefore, a certain protrusion remains on the magnetic disk surface. The smaller the flying height, the higher the frequency with which the MR read head comes into contact with the protrusion. Thermal energy arises when the MR read head comes into contact with the protrusion. The thermal energy changes the resistance in accordance with its temperature coefficient. The resulting read signal then fluctuates so that an accurate read operation cannot possibly be performed. This phenomenon is known as a thermal asperity (hereinafter referred to as a TA).

If the write head comes into contact with a protrusion on the magnetic disk surface during a write, the head/slider assembly unsteadily flies so that servo control may be disturbed. To prevent the write head from writing into a track next to a target track and avoid a write error, a write operation does not start until servo control is stabilized. Therefore, if the write head comes into contact with a protrusion, the settling time increases. Further, if the write head or read head frequently comes into contact with a protrusion, the head life may be shortened or broken pieces of the protrusion may be scattered over the magnetic disk surface to increase the number of protrusions.

To eliminate a flying height margin that is provided to cope, for instance, with machining irregularities and barometric pressure differences, the invention disclosed by Patent Document 1 (Japanese Patent Laid-open No. 2002-150735) uses a piezoelectric element mounted on the head/slider assembly and TA to perform a proper shift amount estimation process and determines the amount of piezoelectric element control (see 0041 and 0042). The proper shift estimation process is then performed at the innermost circular position and outermost circular position to store in memory the optimum application voltages for the piezoelectric element at both positions. In an actual read/write operation, the magnetic head/slider assembly is moved to a target track while reading the servo information at a great flying height with no voltage applied. The proper application voltages stored in memory are then subjected to linear interpolation. The resulting voltage is finally applied to the piezoelectric element (see 0045).

The invention disclosed by Patent Document 2 (Japanese Patent Laid-open No. 10-233070) uses a TA to detect a magnetic spacing between the magnetic disk and magnetic head and uses an actuator, in which a piezoelectric element is incorporated, to provide a constant magnetic spacing (see 0016). Further, the piezoelectric-element-based actuator is used to follow a protrusion on the magnetic disk.

The invention disclosed by Patent Document 3 (Japanese Patent Laid-open No. 10-69747) optimizes the flying height prevailing at the time of track following while preventing the head/slider assembly from colliding against the magnetic disk due to an increase in the flying height. A piezoelectric element for controlling the head/slider assembly flying height is furnished. The correction amount is calculated from a flying height profile curve that is predetermined in accordance with the results of a simulation that is conducted in relation to the head/slider assembly acceleration and speed. A signal is given to the piezoelectric element to keep the flying height constant (see 0015).

BRIEF SUMMARY OF THE INVENTION

It is practically difficult to completely remove protrusions from the magnetic disk surface because, for instance, the manufacturing cost would increase. To reduce the magnetic head flying height and increase the magnetic disk recording density, it is necessary to ensure that the magnetic head does not come into contact with the protrusions on the magnetic disk. Servo control for positioning the magnetic head over a specific track is exercised by performing a seek operation to move the magnetic head to a target track while recognizing a track number from servo data, which is read by the read head, and then performing a following operation to position the read head at a specified position within the target track while correcting the position within the target track in accordance with a position error signal (hereinafter referred to as the PES). Therefore, if the flying height is increased to avoid protrusions during a seek operation or following operation, the read signal gain for the servo data decreases, thereby interfering with servo control or increasing the number of data sectors that cannot be used for a data read/data write operation.

Even if an attempt is made to control the flying height when a protrusion is detected, the control system involves a response delay between the instant at which a flying height change is detected and the instant at which a correction operation is completed. It is therefore difficult to properly adjust the flying height in relation to a protrusion that suddenly appears at a magnetic head position during a seek operation or following operation. Under these circumstances, it is necessary to provide a technology for preventing the magnetic head from coming into contact with a protrusion while exercising proper servo control to keep the read/write performance from deteriorating.

A feature of the present invention is to provide a magnetic disk drive that is capable of controlling the flying height to prevent the magnetic head from coming into contact with a protrusion. Another feature of the present invention is to provide a flying height control method for preventing the magnetic head from coming into contact with a protrusion. Still another feature of the present invention is to provide a manufacturing method for manufacturing a magnetic disk drive that is capable of controlling the flying height to prevent the magnetic head from coming into contact with a protrusion.

According to a first aspect of the present invention, there is provided a magnetic disk drive comprising a magnetic disk on which a plurality of tracks are defined; a head/slider assembly that includes a magnetic head for accessing the magnetic disk; a head support mechanism for supporting the head/slider assembly; a flying height (FH) control mechanism for controlling the flying height of the magnetic head; a recording medium that registers the position information about a protrusion on the surface of the magnetic disk and the operation information about the amount of FH control mechanism operation required for controlling the flying height to prevent the magnetic head from coming into contact with the protrusion; and a processor for referencing the position information and operation information and controlling the FH control mechanism to prevent the magnetic head from coming into contact with the protrusion.

The magnetic disk drive includes the recording medium that registers the position information about a protrusion and the operation information. In accordance with the position information and operation information, the processor controls the FH control mechanism to prevent the magnetic head from coming into contact with the protrusion. The position information and operation information may be registered on different recording media such as a magnetic disk in the magnetic disk drive and a nonvolatile semiconductor memory. The magnetic head may come into contact with the protrusion when a seek operation or following operation is performed. When the flying height increases, it is difficult to read servo data address information. Therefore, a seek operation is started at a reference flying height. The flying height is increased at a position immediately before a track containing the protrusion. After the magnetic head passes through the track, the flying height reverts to the reference flying height. The flying height increase can be timed in accordance with the elapsed time from the start of a seek operation, the servo data address information read during a seek operation, and the position information about the protrusion.

When a following operation is to be performed, the flying height begins to increase a predetermined period of time before a servo sector on which a data sector containing the protrusion is dependent passes through the magnetic head. The FH control mechanism response time is absorbed by providing an adequate flying height for preventing the magnetic head from coming into contact with the protrusion at a position of the servo sector. The flying height increase may be timed when a control start sector, which precedes the servo sector on which the data sector containing the protrusion is dependent by a predetermined number of servo sectors, reaches the magnetic head that flies at the reference flying height. When the flying height is increased before or after the protrusion during a following operation, affected data sectors are rendered useless for user data read/write operations. Therefore, a servo sector on which such data sectors are dependent is registered as a defective one.

According to a second aspect of the present invention, there is provided a control method for controlling the flying height of a magnetic head in a magnetic disk drive that is equipped with an FH control mechanism for controlling the flying height of the magnetic head. The control method comprises the steps of supplying the position information about a protrusion on the surface of a magnetic disk and the operation information about the amount of FH control mechanism operation required for controlling the flying height to prevent the magnetic head from coming into contact with the protrusion; starting a seek operation at a reference flying height; and controlling the FH control mechanism in accordance with the position information and operation information to let the flying height increase above the reference flying height before the magnetic head passes through a track containing the protrusion during the seek operation and reset the flying height to the reference flying height after the magnetic head passes through a track containing the protrusion.

According to a third aspect of the present invention, there is provided a manufacturing method for manufacturing a magnetic disk drive that is provided with an FH control mechanism for controlling the flying height and a reference table. The manufacturing method comprises the steps of writing test data onto a magnetic disk; flying a magnetic head at a reference flying height to read the test data; detecting the contact between the magnetic head and a protrusion on the magnetic disk in the step of reading and registering the position information about the protrusion in the reference table; and registering in the reference table the operation information about the amount of FH control mechanism operation required for preventing the magnetic head from coming into contact with the protrusion.

The operation information can be acquired as a value corresponding to the minimum flying height for operating the FH control mechanism in unit operation amount increments to prevent the magnetic head from coming into contact with the protrusion. Therefore, it is possible to reduce the period of time during which the flying height needs to be greater than the reference flying height in order to prevent the magnetic head from coming into contact with the protrusion during a seek operation and following operation. Consequently, it is possible to provide stable servo control and minimize the number of unusable data sectors.

The present invention provides a magnetic disk drive that is capable of controlling the flying height to prevent the magnetic head from coming into contact with a protrusion. Further, the present invention provides a flying height control method for preventing the magnetic head from coming into contact with a protrusion. Furthermore, the present invention provides a manufacturing method for manufacturing a magnetic disk drive that is capable of controlling the flying height to prevent the magnetic head from coming into contact with a protrusion.

DETAILED DESCRIPTION OF THE INVENTION

Magnetic Disk Drive Overview

Figure 1:
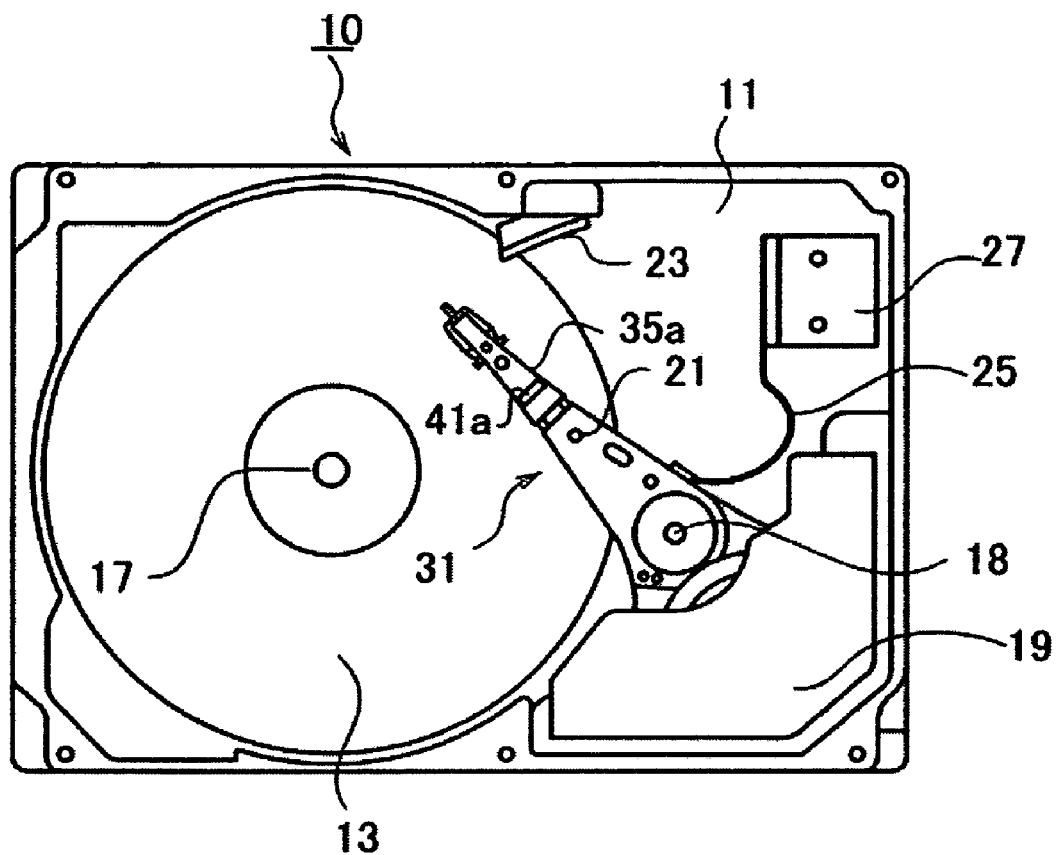
FIG. 1 is a plan view illustrating a magnetic disk drive.
Figure 2:
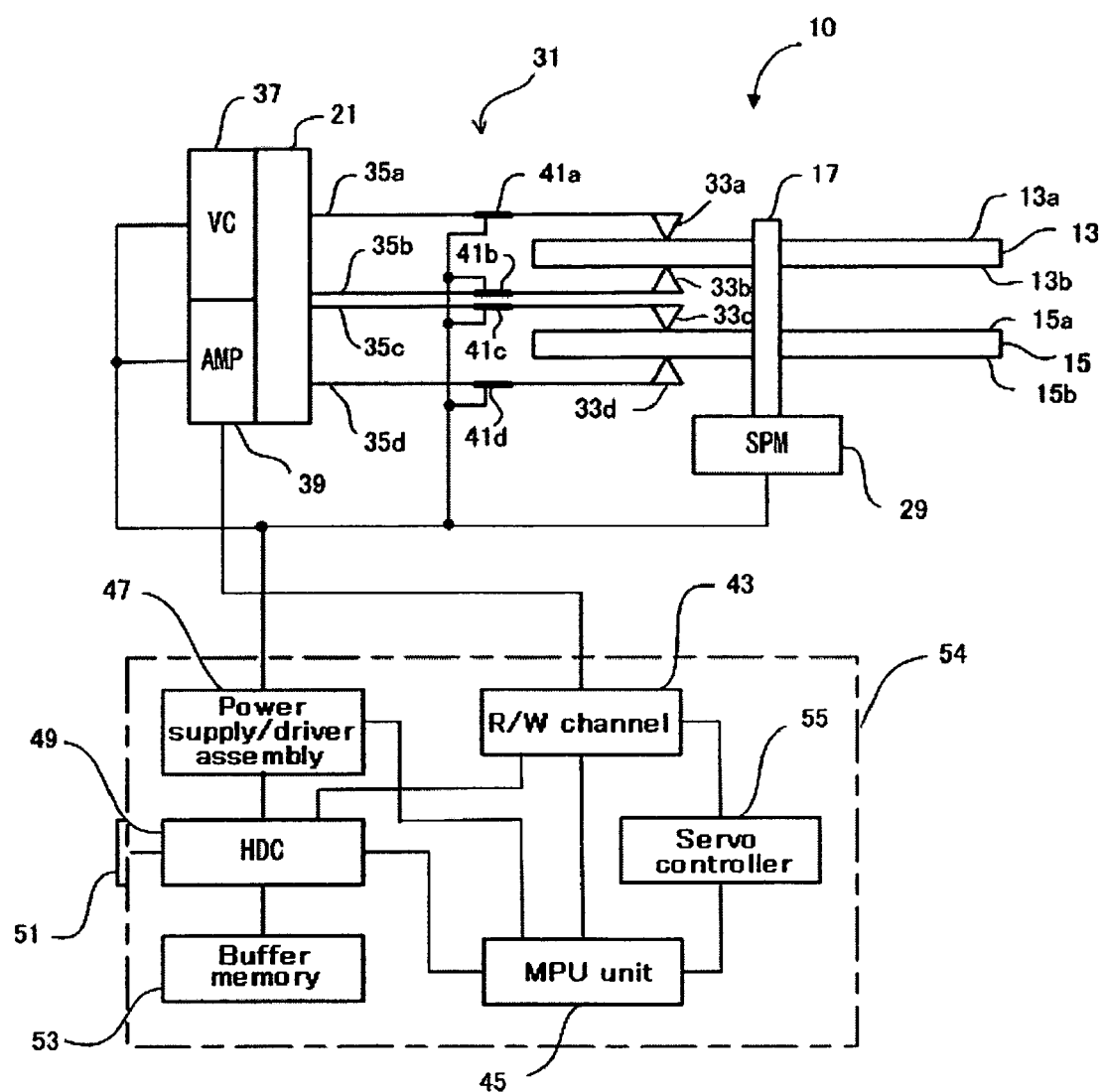
FIG. 2 is a block diagram illustrating a magnetic disk drive.
Figure 3:
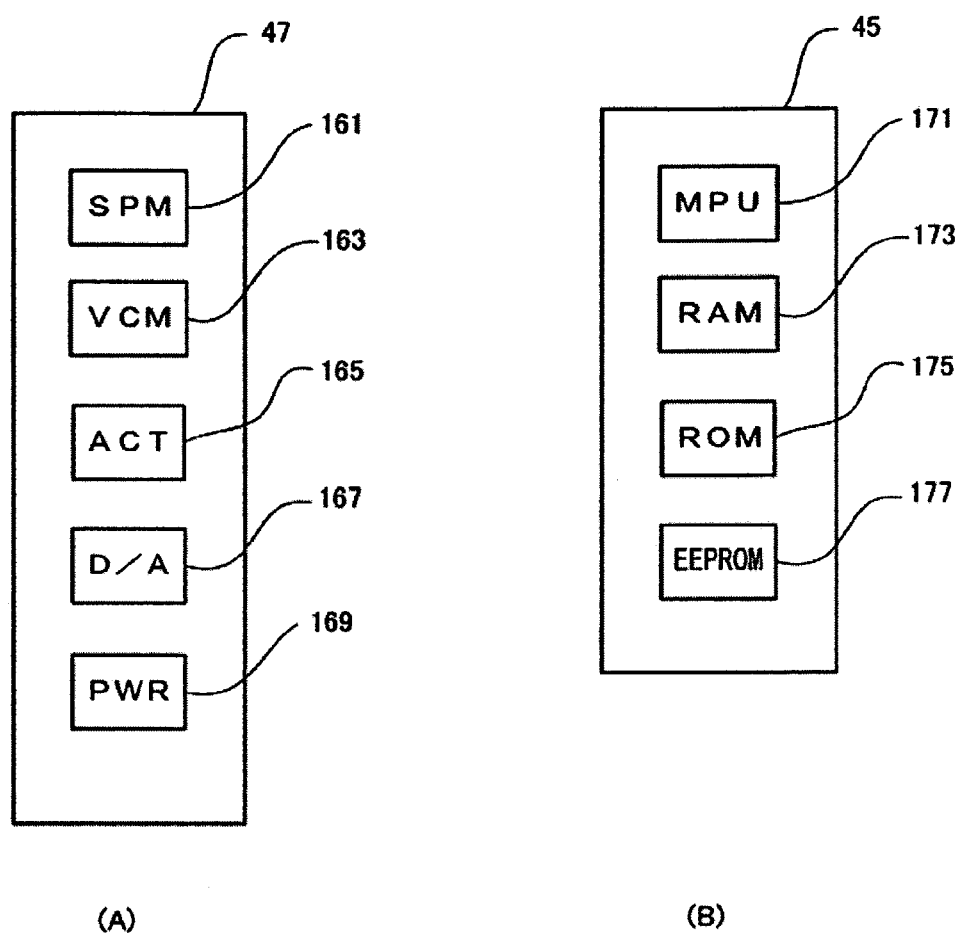
FIGS. 3(A) and 3(B) illustrate the configurations of a power supply/driver assembly and MPU unit.
Figure 4:
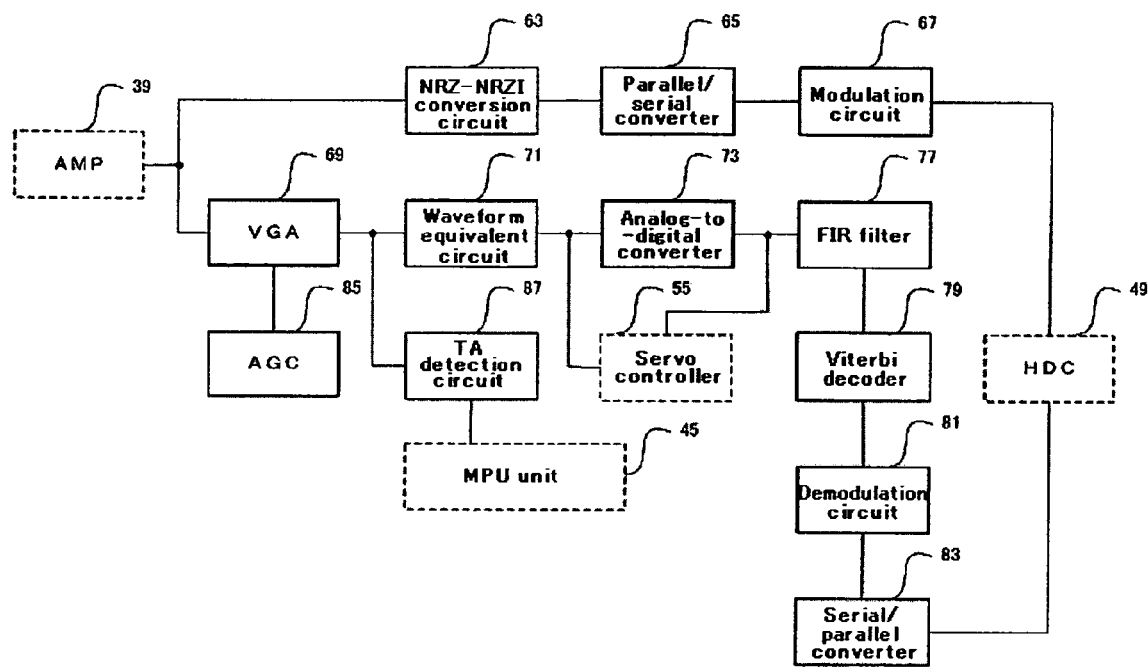
FIG. 4 is a block diagram illustrating a read/write channel.
Figure 5:
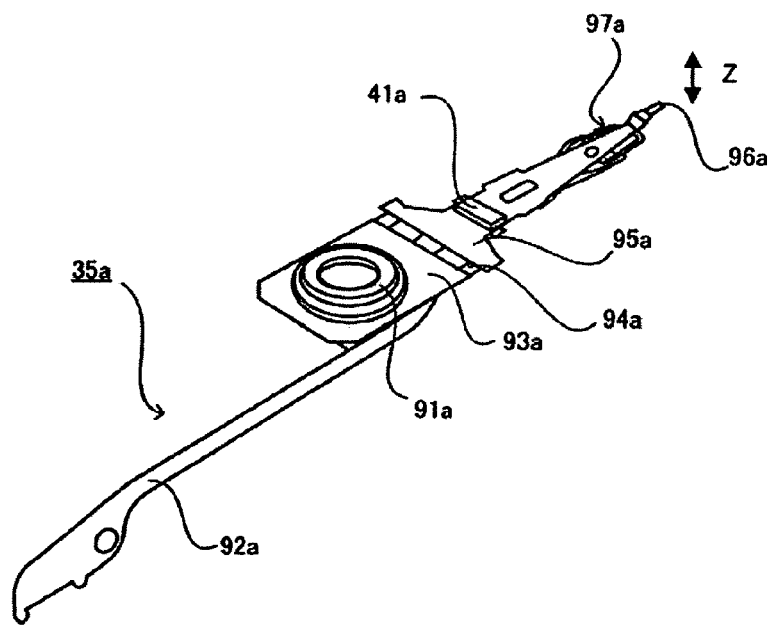
FIG. 5 is a perspective view illustrating a head gimbal assembly on which a piezoelectric actuator is mounted.

FIG. 1 is a plan view illustrating a magnetic disk drive according to one embodiment of the present invention. FIG. 2 is a block diagram. FIGS. 3(A) and 3(B) illustrate the configurations of a power supply/driver section and an MPU unit. FIG. 4 is a read/write channel block diagram. FIG. 5 is a perspective view illustrating a head gimbal assembly (hereinafter referred to as the HGA). Referring to FIGS. 1 and 2, the magnetic disk drive 10 includes a base 11. The base 11 carries two magnetic disks 13 and 15, a head stack assembly 31, a flexible cable 25, and a terminal 27 for connecting the flexible cable 25 to an external circuit board 54. The magnetic disks 13 and 15 are clamped to the rotor section of a spindle motor 29, which is mounted on the base 11. The magnetic disks 13 and 15, which are integral with a spindle shaft 17, rotate at a speed of 15,000 rpm around the center of the spindle shaft 17.

Figure 8:
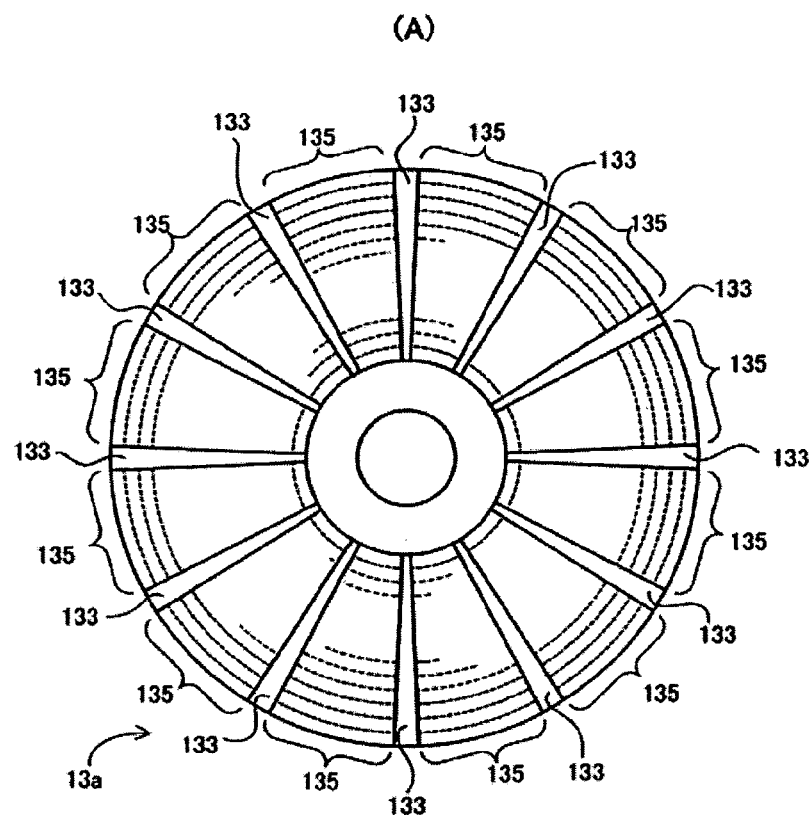
FIGS. 8(A) and 8(B) illustrate a magnetic disk format.
Figure 8:
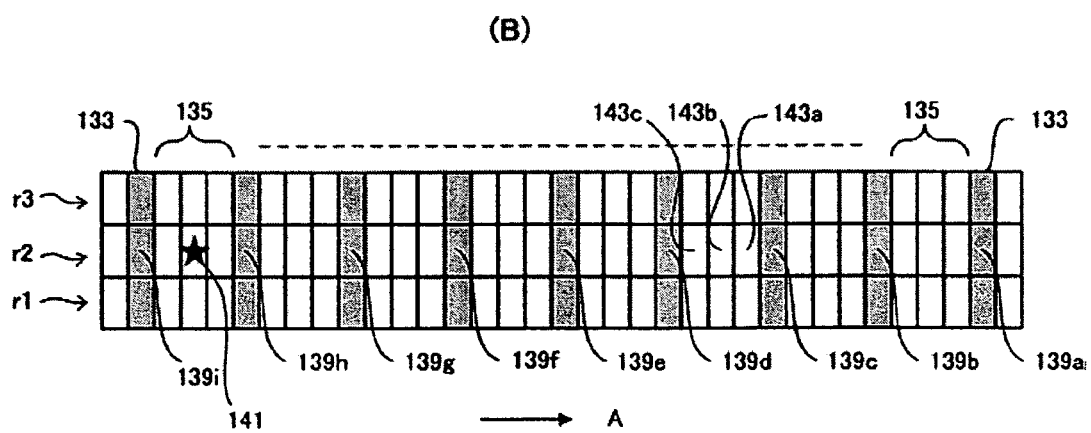

Magnetic disks 13 and 15 have recording surfaces 13a and 13b, and 15a and 15b, respectively. The head stack assembly 31 includes head gimbal assemblies 35a, 35b, 35c, and 35d and an actuator assembly 21. FIGS. 8(A) and 8(B) illustrate the format structure of recording surface 13a of magnetic disk 13. The magnetic disk drive 10 employs a data surface servo method. As shown in FIG. 8(A), which relates to recording surface 13a, each recording surface 13a, 13b, 15a and 15b records servo data. The servo data is written in a plurality of servo sectors 133, which are radially arranged at equal intervals. The servo data define servo tracks. The servo tracks are hereinafter referred to as tracks.

The servo data includes a servo AGC (automatic gain control) for adjusting the gain of an amplifier prior to a servo data read, a servo mark for indicating the beginning of the servo data, a track address written in Gray code, a sector address for indicating a servo sector position in circumferential direction, and a burst pattern for generating a PES, which indicates the amount of read head shift from the track center. Four different burst patterns, which have radially different write positions, are used. A data area 135 is defined between servo sectors 133.

FIG. 8(B) shows three tracks (r1, r2, and r3) that are radially adjacent to each other. As indicated in FIG. 8(B), three data sectors 143a, 143b and 143c are defined in the data area 135 between servo sectors 139c and 139d, which are in servo track r2. The same also holds true for the data area 135 between the other servo sectors and within the other tracks. Each data sector is formatted so that its circumferential position can be identified with reference to the nearest servo sector at the time of a user data write. A special area, which the user cannot access, is defined on a part of magnetic disk 13a. To implement the present embodiment, the special area stores a registration program for registering a protrusion position and a flying height (FH) control program for controlling the flying height during a seek operation and following operation.

Referring to FIG. 2, HGAs 35a, 35b, 35c, and 35d are provided with head/slider assemblies 33a, 33b, 33c, and 33d, which respectively relate to recording surfaces 13a, 13b, 13c, and 13d of a magnetic disk. The HGAs 35a, 35b, 35c, and 35d have virtually the same configuration. Therefore, the structure of HGA 35a will now be described with reference to FIG. 5. As indicated in FIG. 5, HGA 35a is configured as a wiring-incorporated suspension. Its essential part includes a head/slider assembly (not shown), a base plate 93a, a load beam 95a, a hinge 94a, a mount plate 91a, and a flexure 97a. The base plate 93a is provided with an opening. The opening is used to swage the mount plate 91a, which is fastened to the base plate 93a. Consequently, HGA 35a is secured to an actuator arm of the actuator assembly 21.

The hinge 94a is elastic. It joins the base plate 91a to the load beam 95a and applies a pressure load to the load beam 95a so that the head/slider assembly properly flies above the magnetic disk. A lift tab 96a is formed on the leading end of HGA 35a. The lift tab 96a coordinates with a ramp 23 to establish a load/unload system. The flexure 97a retains the leading end of a lead wire 92a, which is extended from the leading end of HGA 35a to a connector section in a cranking manner, and is laser spot welded to the load beam 95a and base plate 93a. The lead wire 92a includes four conductors that connect the flexible cable 25 to the magnetic head, which is formed on the head/slider assembly. The number of conductors varies with the head/slider assembly configuration. If a heater is embedded in a head/slider assembly to control the amount of head thermal expansion, six or eight conductors are provided.

The head/slider assembly 33a is fastened to a flexure tongue of the flexure 97a so that a pivot motion or gimbal motion is performed during a track following operation to maintain the magnetic head flying height within a predetermined range. Head/slider assemblies 33a, 33b, 33c, and 33d respectively include an inductive write head and a GMR (giant magnetoresistive) read head. The head/slider assembly structure will be described later with reference to FIG. 7. The piezoelectric actuator 41a is mounted on the surface of the load beam 95a, which is made of a thin stainless steel sheet. Similarly, piezoelectric actuators 41b, 41c, and 41d are mounted on HGAs 35b, 35c, and 35d, respectively.

Each piezoelectric actuator comprises a piezoelectric element that is made, for instance, of lead zirconate titanate (PZT). When a DC voltage is applied as an operation amount, the piezoelectric element invokes expansion/contraction due to a piezoelectric effect. In the present embodiment, HGAs 35a, 35b, 35c, and 35d are configured to distort the load beam by controlling the magnitude of the DC voltage applied to piezoelectric actuators 41a, 41b, 41c, and 41d and vary the position of each head/slider assembly in the Z direction as indicated in FIG. 5 to control the flying height. Owing to this configuration, the magnetic head flying height of each head/slider assembly 33a, 33b, 33c and 33d can be individually controlled.

Returning to FIGS. 1 and 2, the actuator assembly 21 is configured as a rotary actuator, which comprises an actuator arm for supporting HGAs 35a, 35b, 35c, and 35d, a stationary pivot assembly section that constitutes a pivot shaft 18, and a coil support for retaining a voice coil 37 so that HGAs 35a, 35b, 35c, and 35d turn on the pivot shaft 18. The voice coil 37, a yoke 19, and a voice coil magnet (not shown) constitute a voice coil motor (hereinafter referred to as the VCM). A head amplifier 39 is mounted on a carriage assembly 21. The head amplifier 39 includes a read amplifier, a write driver, a driver register, and a head changeover circuit.

The circuit board 54 is mounted outside the base 11 to carry a read/write channel 43, a servo controller 55, an MPU unit 45, a power supply/driver assembly 47, a hard disk controller (HDC) 49, and a buffer memory 53. The read/write channel 43 is a circuit for processing the read and write signals for user data and servo data and will be described in detail later with reference to FIG. 4.

The servo controller 55 includes an address detection circuit, a sample-and-hold circuit, a sampling signal generation circuit, and a computation circuit. The address detection circuit reads a servo data servo mark from a read pulse signal, which is output from an analog-to-digital converter 73 (FIG. 4) in the read/write channel 43 to generate a servo interrupt signal and generates a sector address signal and track address signal for a servo sector, and delivers the generated signals to the MPU unit 45. The sample-and-hold circuit retains a burst pattern read signal (hereinafter referred to as the burst signal), which is transmitted from a waveform equivalent circuit 71 (FIG. 4) in the read/write channel 43, until the read head reads new servo data.

The sampling signal generation circuit generates a sampling timing signal, which determines the timing for reading four burst signals that are transmitted from the waveform equivalent circuit 71 (FIG. 4). The servo controller 55 generates a PES with the sample-and-hold circuit, sampling signal generation circuit, and computation circuit, and sends the generated PES to the MPU unit 45. The HDC 49 functions as an interface with a host computer, and includes an ECC circuit, which generates a correction bit for data bits that are transmitted from a buffer controller for controlling the buffer memory 53 and from the host computer, and corrects user data that is read from the magnetic disk.

The buffer memory 53 is used to achieve high-speed data transfer between the host computer and the magnetic disk drive 10. As shown in FIG. 3(A), the power supply/driver assembly 47 includes an SPM driver 161 for supplying an operating current to the spindle motor 29, a VCM driver 163 for supplying an operating current to the voice coil 37, an ACT driver 165 for supplying an operating voltage to piezoelectric actuators 41a, 41b, 41c, and 41d, a digital-to-analog converter 167 for receiving a digital operating signal from the MPU unit, converting the received signal to an analog signal, and supplying the resulting analog signal to the drivers, and a power supply circuit 169 for supplying power to the entire magnetic disk drive. The circuit board 54 carries an interface connector 51 for establishing data communication with the host computer. The SPM driver 161, VCM driver 163, and ACT driver 165 are controlled by an operating signal that is transmitted from the MPU unit 45.

In the present embodiment, the ACT driver 165 and piezoelectric actuators 41a, 41b, 41c, and 41d constitute a flying height control mechanism. In accordance with an operating signal that is received from the MPU unit 45, the ACT driver 165 individually controls the flying height of each magnetic head by controlling the operating voltage to be applied to piezoelectric actuators 41a, 41b, 41c, and 41d. In the present embodiment, the flying height of each magnetic head is minimized while the ACT driver 165 is not supplying the operating voltage to piezoelectric actuators 41a, 41b, 41c, and 41d. The resulting minimum flying height is referred to as the reference flying height.

The reference flying height represents a target value that is set as an ideal flying height. However, the reference flying height prevailing when the head/slider assembly actually flies above the magnetic disk slightly varies with a change in the balance between the pressure applied to the head/slider assembly air bearing surface by an airflow and the pressure load applied by the load beam. The reference flying height also varies with the radial position of the magnetic disk due to changes in the airflow speed and in the angle between the air bearing surface axis and track tangent. As described above, the reference flying height is not a fixed value. It is a value within a range that is predefined for user data read/write operations. The reference flying height may alternatively be obtained when the ACT driver 165 supplies a certain operating voltage to piezoelectric actuators 41a, 41b, 41c, and 41d.

As shown in FIG. 3(B), the MPU unit 45 includes an MPU 171 for controlling the overall operation of the magnetic disk drive 10, a ROM 175 for storing various programs and firmware, an EEPROM 177 for storing various parameters and reference table, and a RAM 173, which is used for program execution and as a work area. When the host computer specifies a target track address for a seek operation, the MPU 171 uses a track address read from servo data to recognize the magnetic head position prevailing during a seek operation, and sends an operating signal to the VCM driver 163.

The MPU 171 reads a track address from a servo sector that the read head passes during a seek operation, calculates the actual move speed of the head/slider assembly, generates an operating signal for the VCM driver 163 in order to reduce the deviation from a value predetermined by a speed table, and controls the head/slider assembly speed accordingly. When the read head approaches a target track, the MPU 171 switches from a speed control mode to a position control mode, and calculates the operating signal value to be transmitted to the VCM driver 163 for the purpose of placing the read head at a target position in accordance with the PES transmitted from the servo controller 55. The term "following operation" denotes an operation that the MPU 171 performs to control the VCM driver 163 with the PES for the purpose of placing the read head at the target position. The MPU 171 executes a registration program and FH control program that are loaded into the RAM 173 from a dedicated area on the magnetic disk 13.

The EEPROM 177 is provided with a defect map (hereinafter referred to as the DM). The DM is used to register the address of a defective data sector, which is rendered defective by an existing protrusion or damaged magnetic layer, or the address of a servo sector on which a defective data sector depends. The dependence of a data sector on a servo sector will be described later with reference to FIG. 8(B). The EEPROM 177 is also provided with a control table, which is used to register operation information for setting the magnetic head flying height to avoid contact with a protrusion. In accordance with the operation information, the MPU 171 generates an operating signal that is to be supplied to the ACT driver 165. The ACT driver 165 applies an operating voltage to the piezoelectric actuator in accordance with the operating signal. In the present embodiment, as described later, the MPU 171 executes the FH control program to control the magnetic head flying height in accordance with the protrusion position information registered in the DM and the operation information registered in the control table, thereby preventing the magnetic head from coming into contact with a protrusion.

Read/Write Channel Configuration

The configuration of the read/write channel 43 will now be outlined with reference to FIG. 4. The read/write channel includes a write circuit and a read circuit, and changes its operation mode in accordance with a read gate signal and write gate signal that are to be received from the MPU unit 45. The write circuit mainly includes a modulation circuit 67, a parallel/serial converter 65, and an NRZ-NRZI conversion circuit 63. The modulation circuit 67 receives user data from the HDC 49 and converts the received user data to an RLL (Run Length Limited) code, which is suitable for recording onto a recording medium. The parallel/serial converter 65 receives the RLL code from the modulation circuit and subjects the received RLL code to serial/parallel conversion.

The NRZ-NRZI conversion circuit 63 converts an NRZ signal, which is a format for user data, to an NRZI (Non-Return to Zero Inverse) signal, which is suitable for recording onto a magnetic disk, and sends the resulting NRZI signal to the write driver for the head amplifier 39. The read circuit mainly includes a variable gain amplifier (VGA) 69, an automatic gain controller (AGC) 85, a waveform equivalent circuit 71, an analog-to-digital converter 73, an FIR filter 77, a Viterbi decoder 79, a demodulation circuit 81, and a serial/parallel converter 83. The amplitudes of the user data and servo data read signals received from the head amplifier 39 are rendered constant by the variable gain amplifier 69 and automatic gain controller 85.

The waveform equivalent circuit 71 includes a low-pass filter that can apply a programmable change to the high-frequency gain, and eliminates noise for waveform equalization. Equalization is a signal process in which the read signal waveform is adjusted for an assumed PR (Partial Response) class. The analog-to-digital conversion circuit 73 includes a differentiation circuit, a filter, and a comparator, and generates a read pulse signal from an analog read signal. The FIR (Finite Impulse Response) filter 77 is a digital filter that includes a plurality of series-connected delay operators, sets a tap value, and generates an easy-to-decode signal. The Viterbi decoder 79 receives a signal that is processed by the FIR filter 77, processes the received signal with a PRML (Partial Response Maximum Likelihood) circuit, and outputs the processed signal as an RLL code. The demodulation circuit 81 converts the RLL code to NRZ code train data in user data format. The serial/parallel converter 83 converts the NRZ code train to parallel data and forwards the parallel data to the HDC 49.

Figure 6:
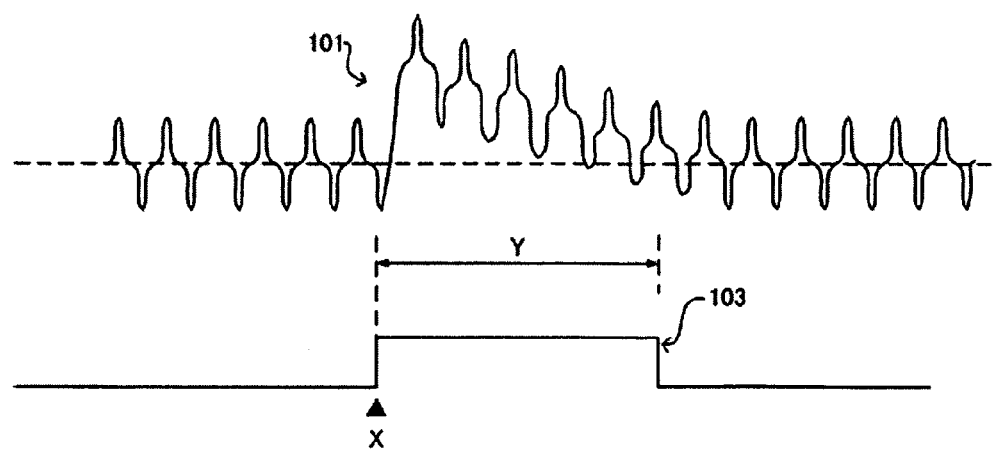
FIG. 6 illustrates how a read signal changes when a thermal asperity occurs.

The read/write channel 43 includes a TA detection circuit 87, which is connected to the output of the automatic gain controller 69. The TA detection circuit 87 detects a read signal fluctuation, which occurs when the GMR read head comes into contact with a protrusion, as a TA, and temporarily stops the operation of the read/write channel. FIG. 6 illustrates how the read signal changes when a TA occurs. When the GMR read head comes into contact with a protrusion at position X, the DC level 103 of a read signal 101 that is fed from the automatic gain amplifier 69 is high for period Y. In the present embodiment, the TA detection circuit 87 detects the occurrence of a TA from the DC level 103, and transmits a TA detection signal to the MPU unit 45.

Magnetic Head Configuration

Figure 7:
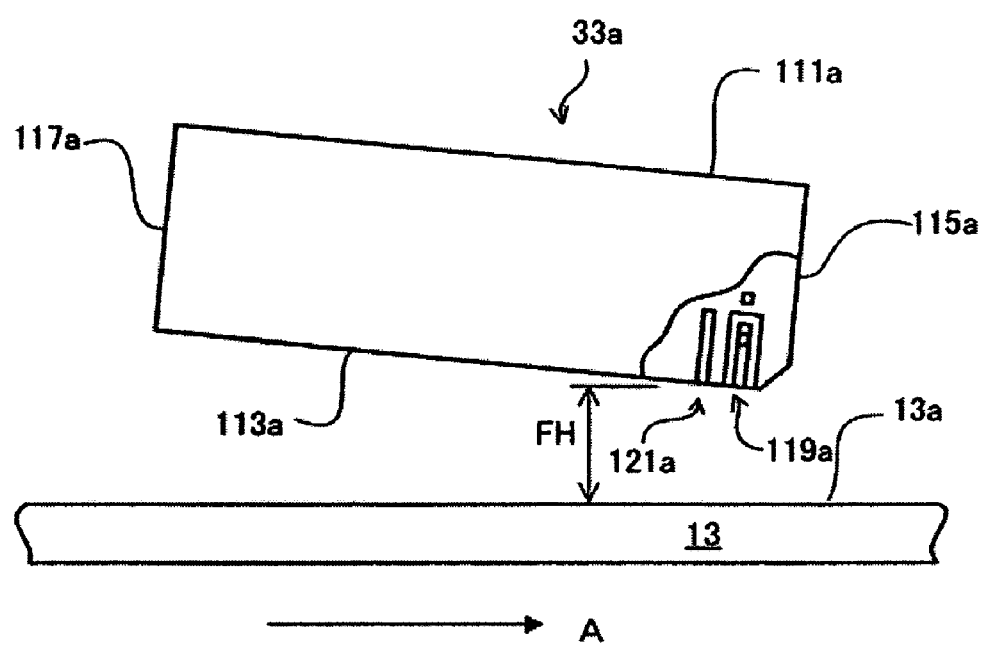
FIG. 7 illustrates the flying height of a head/slider assembly.

FIG. 7 is a side view illustrating a head/slider assembly 33a that is flying above a recording surface 13a of a magnetic disk 13, which rotates in the direction of arrow-A. The head/slider assembly 33a includes an air bearing surface 113a, which receives a lifting force from an airflow that is generated on the magnetic disk surface due to rotation, a stationary surface 111a for the flexure tongue, a leading edge (air inflow end) lateral surface 117a, and a trailing edge (air outflow end) lateral surface 115a. A thin-film write head 119a and a GMR read head 121a are internally formed and positioned toward the trailing edge lateral surface 115a. An MR (magnetoresistive) read head may be used as a substitute for the GMR read head 121a.

A write gap, which the write head 119a uses to generate a magnetic field for a data write, and a read gap, which the read head 121a uses to detect a magnetic field change recorded on the magnetic disk, are exposed on the air bearing surface 113a. The write head 119a and read head 121a are arranged in the length direction of the head/slider assembly and positioned at a predetermined distance from each other.

The write head 119a comprises a magnetic pole piece and a coil. The magnetic pole piece forms a write gap on the air bearing surface 113a and generates a write magnetic field. The coil is connected to a slider pad (not shown), which is formed on the trailing edge lateral surface 115a. The slider pad causes a write current flow to the coil to generate a signal magnetic field in the write gap, thereby magnetizing the magnetic layer of the magnetic disk.

The GMR read head 121a includes an insulation layer, a shield layer, a giant magnetoresistive film (GMR film), and a magnetic domain control layer. The magnetic domain control layer is used to apply a bias magnetic field, which is oriented in a fixed direction, to GMR films on both sides of the GMR film. Both ends of the GMR element are connected to the slider pad, which is formed on the trailing edge lateral surface 115a, so that the slider pad supplies a bias current or sense current. The GMR film resistance value changes under the influence of a signal magnetic field that is generated from the magnetic layer. Resistance value changes are then detected as voltage changes relative to the bias current so that the information recorded on the magnetic disk can be read.

Referring to FIG. 7, the head/slider assembly 33a flies at a slight height above the recording surface 13a. As regards the head/slider assembly 33a flying above the recording surface 13a, the flying height on the side toward the leading edge lateral surface 117a is slightly greater than the flying height on the side toward the trailing edge lateral surface 115a. This flying height difference is provided to let the head/slider assembly 33a maintain a proper attitude for a stable fly, cause a smooth airflow between the air bearing surface 113a and recording surface 13a, and allow the air bearing surface 113a to receive an appropriate buoyant force.

Consequently, the flying height slightly varies with the measurement position on the air bearing surface 113a. In this document, the flying height is defined with respect to a specific position on the air bearing surface (e.g., write head flying height, read head flying height, head/slider assembly flying height, or magnetic head flying height). However, the head/slider assembly flying height is used when no specific position is targeted. The magnetic head flying height is used as either or both of the write head flying height and read head flying height.

Registering an Address Indicating the Position of a Protrusion That May Incur a TA Referring to FIG. 8(B), the center positions of tracks r1, r2, and r3 are determined in accordance with a PES, which is generated from a burst signal. While a following operation is being performed, the read head is positioned at the center of a track or at a predefined location between track centers. As explained with reference to FIG. 7, there is a gap between the write head 119a and read head 121a. Therefore, a yaw angle is generated for head/slider assembly 33a, which is moved by a rotary actuator. Consequently, a servo sector 133 and data sector on the same track do not generally correlate to each other. If, for instance, the read head 121a is positioned over track r3, the write head 119a may be positioned over track r1. To read user data written on track r3 in such an instance, the MPU 171 executes a position calculation program, which is incorporated in the firmware, to position the read head 121a over track r1.

When a following operation is performed in relation to track r2 of the magnetic disk 13 that is rotating in the direction of arrow A, the read head 121a sequentially reads burst patterns beginning with servo sector 139a and continuing toward servo sector 139i, and the waveform equivalent circuit 71 outputs a burst signal to the servo controller. Upon receipt of a burst signal from each servo sector, the servo controller 55 generates a PES and transmits the generated PES to the MPU unit 45. The MPU unit 45 then calculates an operating signal value for the VCM driver 163 for the purpose of placing the read head 121a at a target position.

The servo controller 55 holds the signal read from servo sector 139c during the time interval between the instant at which the read head 121a reads a burst pattern of servo sector 139c and the instant at which the read head 121a reads a burst pattern of servo sector 139d. Therefore, control is not exercised according to the actual position information about the read head 121a in data sectors 143a, 143b, and 143c. Thus, the position of the read head 121a relative to data sectors 143a, 143b, and 143c, which succeed servo sector 139c, depends on the PES generated from the burst pattern of servo sector 139c. In other words, data sectors 143a, 143b, and 143c depend on servo sector 139c.

Figure 9:
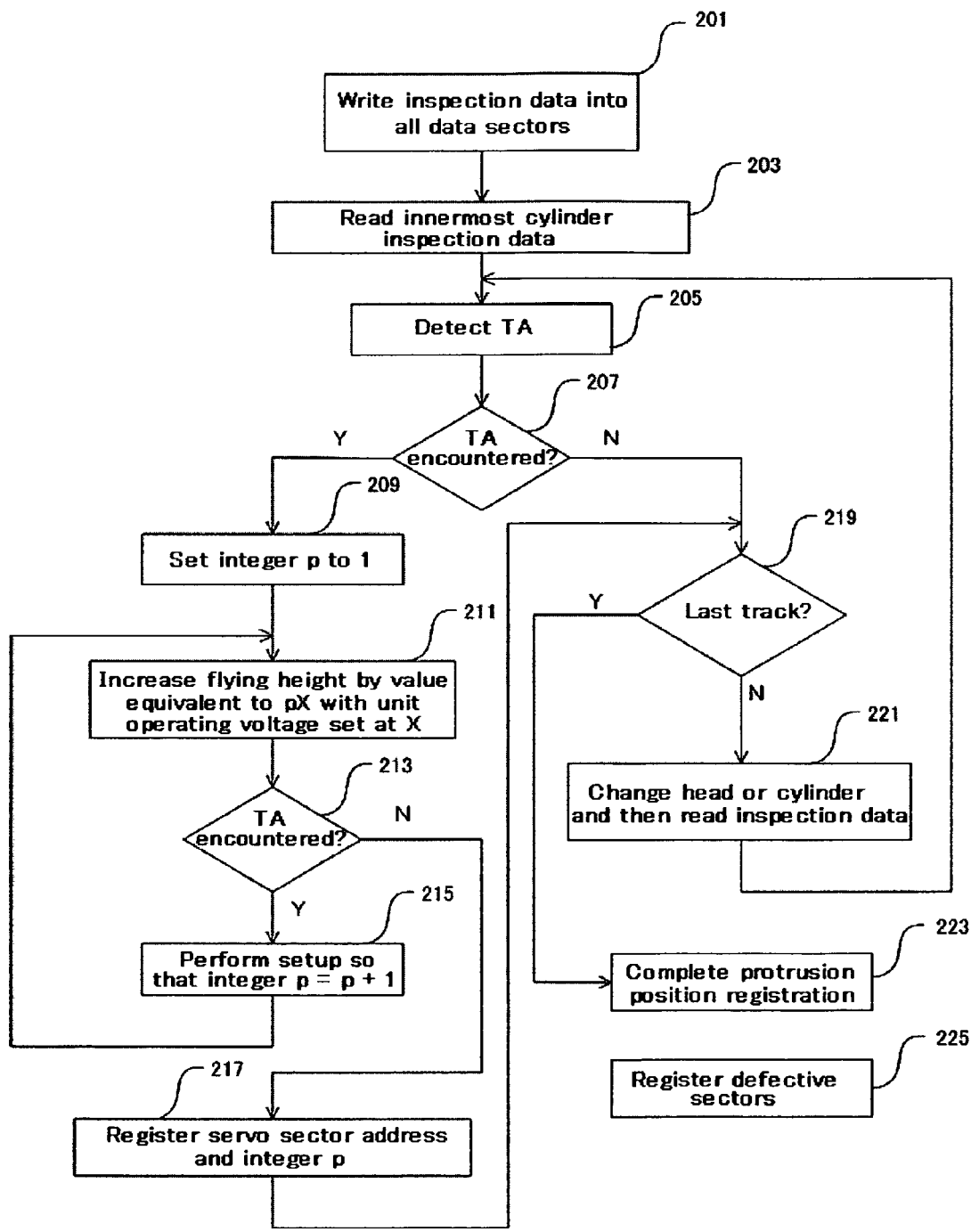
FIG. 9 is a flowchart illustrating a sequence for registering a protrusion position.

The procedure for inspecting recording surfaces 13a, 13b, 13a, and 15b of the magnetic disks when a protrusion exists on each recording surface as in the case of data sector 141, registering an address indicating the position of a protrusion in the DM of the EEPROM 177, and registering the operation information for generating the operating signal to be supplied to the ACT driver 165 as needed to prevent the magnetic head from coming into contact with a protrusion will now be described with reference to a flowchart in FIG. 9. A protrusion may exist in a servo sector. However, it is assumed that the servo data can be read from all available servo sectors because a preprocessing operation is performed by checking for protrusions in the servo sectors, disabling the whole track that contains a servo sector having a protrusion, and disabling servo sectors close to the servo sector having a protrusion. It is also assumed that the registration program is loaded into the RAM 173 from a dedicated area on the magnetic disk and can be executed by the MPU 171.

The procedure indicated in FIG. 9 is performed by allowing the MPU 171 in the magnetic disk drive 10 to execute the registration program. In step 201, inspection data is written into all data sectors. In this instance, the MPU unit 45 does not supply an operating signal to the ACT driver 165 of the power supply/driver assembly 47. Therefore, the magnetic heads on head/slider assemblies 33a, 33b, 33c, and 33d are flying at the reference flying height.

In step 203, the MPU 171 positions the read head 121a over the innermost cylinder of recording surface 13a and lets the read head 121a perform a following operation to read the inspection data written on the innermost track of recording surface 13a. If no protrusion is detected while the innermost track of recording surface 13a makes one revolution, the MPU 171 sends a signal to the head changeover circuit of the head amplifier 39 to enable the read head on head/slider assembly 33b and reads the inspection data recorded on the innermost track of recording surface 13b during one revolution. In the subsequent inspection, the magnetic disk is rotated at least one turn at a track in each inspection position of each recording surface that reads the inspection data, and then the read head is moved to a track at another inspection position. If a protrusion is detected while the magnetic disk is rotated one turn at a track in each inspection position, the read head is moved to another inspection position after the associated position information and operation information are registered.

In step 205, the TA detection circuit 87 of the read/write channel 43 checks for the occurrence of a TA while the inspection data is being read. When the TA detection circuit 87 detects a TA detection signal, which is shown in FIG. 6, from a read signal of the variable gain amplifier 69, which is read at an inspection position of a certain recording surface, the TA detection circuit 87 notifies the MPU unit 45 of such a signal detection. Upon receipt of the TA detection signal, the MPU 171 positions the read head over a track in the inspection position of the associated recording surface until the address of a location at which the protrusion exists is registered.

If, for instance, the TA detection circuit 87 outputs a TA detection signal when the inspection data on recording surface 13a indicates that the read head is brought into contact with a protrusion that is generated in a data sector 141 on track r2, which is shown in FIG. 8(B), the MPU 171 continues to read the inspection data on track r2 of recording surface 13a while leaving the read head on head/slider assembly 33a enabled. In this instance, the read head is at the reference flying height. Therefore, the read head comes into contact with the protrusion upon each rotation. As a result, the TA detection signal is output to the MPU unit 45 each time the read head comes into contact with the protrusion.

In step 209, the MPU 171 sets up the registration program so that the integer p=1. The value of the integer p is used to variously set the operating signal to be applied to the ACT driver 165. When the reference flying height is employed for flying, the integer p is set at 0. In step 211, when the unit operating voltage to be applied to a piezoelectric actuator from the ACT driver 165 is X, the MPU 171 generates an operating signal, which corresponds to the operating voltage pX=X, in accordance with the integer p, which is the operation information, and supplies the generated operating signal to the ACT driver 165.

The ACT driver 165 applies the operating voltage X, which represents the amount of operation, to piezoelectric actuator 41a, which corresponds to the read head 121a that has output the TA detection signal, in order to increase the flying height of head/slider assembly 33a accordingly. If the flying height is left increased during one track rotation, the burst pattern read capacity lowers to the detriment of a following operation. Therefore, the flying height is increased merely at a location close to a data sector 141 where the protrusion exists. In the other locations, the flying height is reset to the reference flying height. When, during a following operation for registration, the timing for supplying an operating signal to the ACT driver 165 for flying height control purposes and the timing for terminating such a signal supply are adjusted for the actual following operation timing, which will be described later with reference to FIG. 13, the acquired operation information can be used to properly prevent the magnetic head from coming into contact with a protrusion at the minimum flying height.

Step 213 is performed to judge whether a TA occurs when a data sector 141 comes again to the read head position due to magnetic disk rotation. If a TA occurs again, the MPU 171 performs setup (p=p+1=2) in step 215, generates an operating signal corresponding to the operating voltage 2×, and sends the generated signal to the ACT driver 165. In step 211, the ACT driver 165 applies the operating voltage 2× to piezoelectric actuator 41a to increase the flying height of head/slider assembly 33a accordingly.

When steps 211 to 215 are repeatedly performed, the integer p is incremented by one at a time. Each time the integer p is incremented by one, the read head flying height prevailing when the data sector 141 passes through the read head is incremented by a value corresponding to the unit operating voltage X, and the read head flies above the data sector 141 at a flying height that changes upon each magnetic disk rotation. When, in the course of time, the flying height of head/slider assembly 33a increases to the extent that the magnetic head does not come into contact with a protrusion when it passes through the data sector 141, the flying height is no longer detected in step 213. As a result, the flow proceeds to step 217.

Step 217 is performed to register the cylinder address, sector address, and head number of a servo sector 139h on which the data sector 141 where a TA has occurred is dependent in the DM of the EEPROM 177 as the protrusion position information and to register the integer p in the control table of the EEPROM 177 as the operation information for generating an operating signal that is to be supplied to the ACT driver 165 for the purpose of preventing the magnetic head from coming into contact with a protrusion. The write head or read head flying height decreases with an increase in the temperature due to element thermal expansion. Therefore, a corrected value for the integer p, which is calculated from the difference between the temperature prevailing at the time of registration and the temperature assumed for actual use, may be simultaneously registered. If there is a great difference between the read head flying height and write head flying height, the integer p is corrected in accordance with the head/slider assembly shape and dimensions and the attitude of a flying head/slider assembly, and then the resulting corrected value is registered. The corrected value for the integer value p, which is to be registered, is also a part of the operation information. The MPU 171 uses the operation information to generate an operating signal that is to be supplied to the ACT driver 165 for the purpose of determining the operating voltage to be applied to piezoelectric actuator 41a.

After the flying height is increased, it is difficult to read the cylinder address and sector address of a servo sector 139h. Therefore, they should be read when the first TA is detected. The address information about a servo sector 139h on which the data sector 141 depends is read before the data sector 141 arrives at the read head position. Therefore, the MPU 171 can recognize the address of the servo sector 139h even when a TA occurs. The MPU 171 uses the cylinder address and head number to identify a recording surface track containing a protrusion although there are four recording surfaces.

When protrusion position information and flying height operation information are completely registered in step 217, the process flow proceeds to step 219. Step 219 is performed to judge whether the last track has been inspected. In the present embodiment, the last track is a track on recording surface 15b, which constitutes the outermost cylinder. At present, the innermost track on recording surface 13a is checked for a protrusion. If not all tracks including the last track are inspected, the flow proceeds to step 221. In step 221, the MPU 171 enables the read head corresponding to recording surface 13b. The flow then returns to step 205. In step 205, the inspection data recorded on the innermost track on recording surface 13b is read. Step 207 is then performed to check for the occurrence of a TA. When a TA is detected, the flow proceeds to step 209. As described earlier, step 209 is performed to register the cylinder address of a servo sector on which a data sector where the TA is detected is dependent, the sector address, the head number, the integer p, and its corrected value.

If no TA is detected, the flow proceeds from step 207 to step 219. Step 219 is performed to judge whether all tracks including the last track are inspected. If all tracks including the last track are not completely inspected, the cylinder is changed when step 221 is performed to inspect the current cylinder, which comprises the tracks on recording surfaces 13a, 13b, 15a, and 15b. The cylinder is changed by shifting the read head toward the outermost track by ¼ or ½ the one track pitch while making use of the PES. The read head is shifted by an amount that is smaller than one track pitch in order to detect even a small protrusion between track centers with high accuracy.

When step 219 is performed to verify that the inspection and registration operations are completed for all tracks including the last track, the flow proceeds to step 223. In step 223, the protrusion position registration process is completed. Step 223 is performed to register the cylinder address, sector address, and head number of a servo sector on which data sector where a protrusion is detected is dependent in the DM of the EEPROM 177 as the position information and register the integer p and its corrected value in the control table of the EEPROM 177. A servo sector on which a data sector where a protrusion is detected is dependent is hereinafter referred to as a protrusion sector. Further, a track to which a protrusion sector belongs is hereinafter referred to as a protrusion track.

In step 225, seven consecutive servo sectors on either side of the protrusion sector on the same track are registered as defective servo sectors. If, referring to FIG. 8(B), servo sector 139h is a protrusion sector, servo sectors 139a to 139g (seven servo sectors) and seven consecutive servo sectors beginning with servo sector 139i are registered in the DM as defective servo sectors. Data sectors unavailable for a user data write depend on the defective servo sectors registered in this manner because the magnetic head flying height is rendered greater than the reference flying height in order to avoid contact with a protrusion. The MPU 171 concludes that data sectors dependent on registered defective servo sectors are unavailable, and does not use such data sectors for a user data write.

The flowchart shown in FIG. 9 indicates that the inspection process begins with the innermost cylinder and continues toward the outermost cylinder. Alternatively, however, the inspection process may begin with the outermost cylinder and continue toward the innermost cylinder. In steps 211 to 215, the integer p is incremented to gradually increase the flying height above the reference flying height. Alternatively, however, when a TA is detected upon the first contact, a great integer p may be set to sufficiently increase the flying height. Subsequently, the integer p may be gradually decreased to decrease the flying height until a TA is detected again. The integer registered in this instance is greater by one than the value p that prevails when a TA is detected again as a result of a gradual decrease in the flying height.

The flowchart shown in FIG. 9 indicates that the contact between a protrusion and head/slider assembly is detected by detecting a TA for the GMR read head, and that the voltage to be applied to the piezoelectric actuator to obtain the minimum flying height for avoiding the contact and the protrusion position are determined and registered. However, the present invention is not limited to the protrusion detection method that detects a TA. An alternative protrusion detection method is to detect, for instance, a vibration or sound that is generated due to the contact between a protrusion and head/slider assembly.

Seek Operation Method

Figure 10:
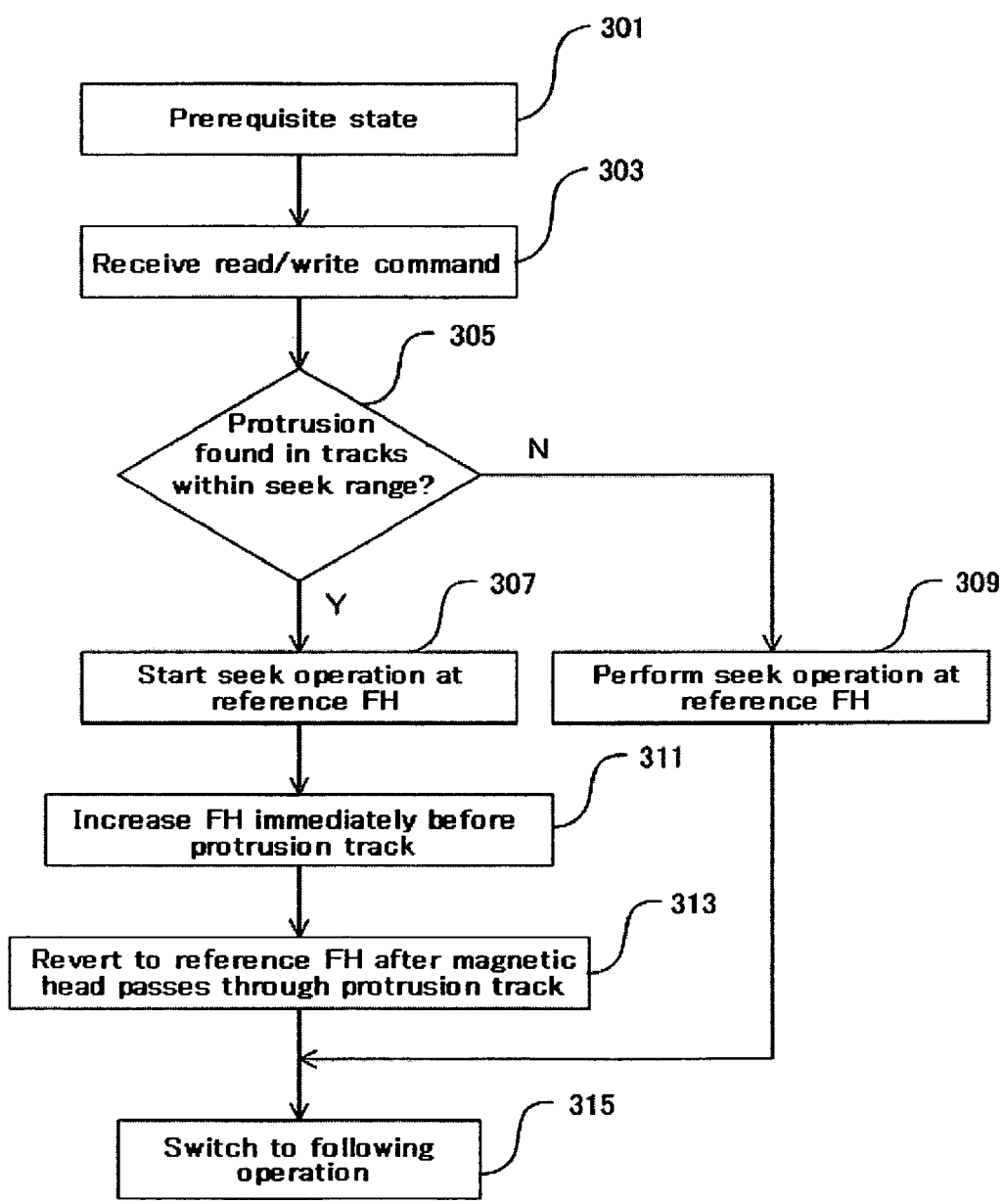
FIG. 10 is a flowchart illustrating a sequence for preventing a magnetic head from colliding against a protrusion during a seek operation.
Figure 11:
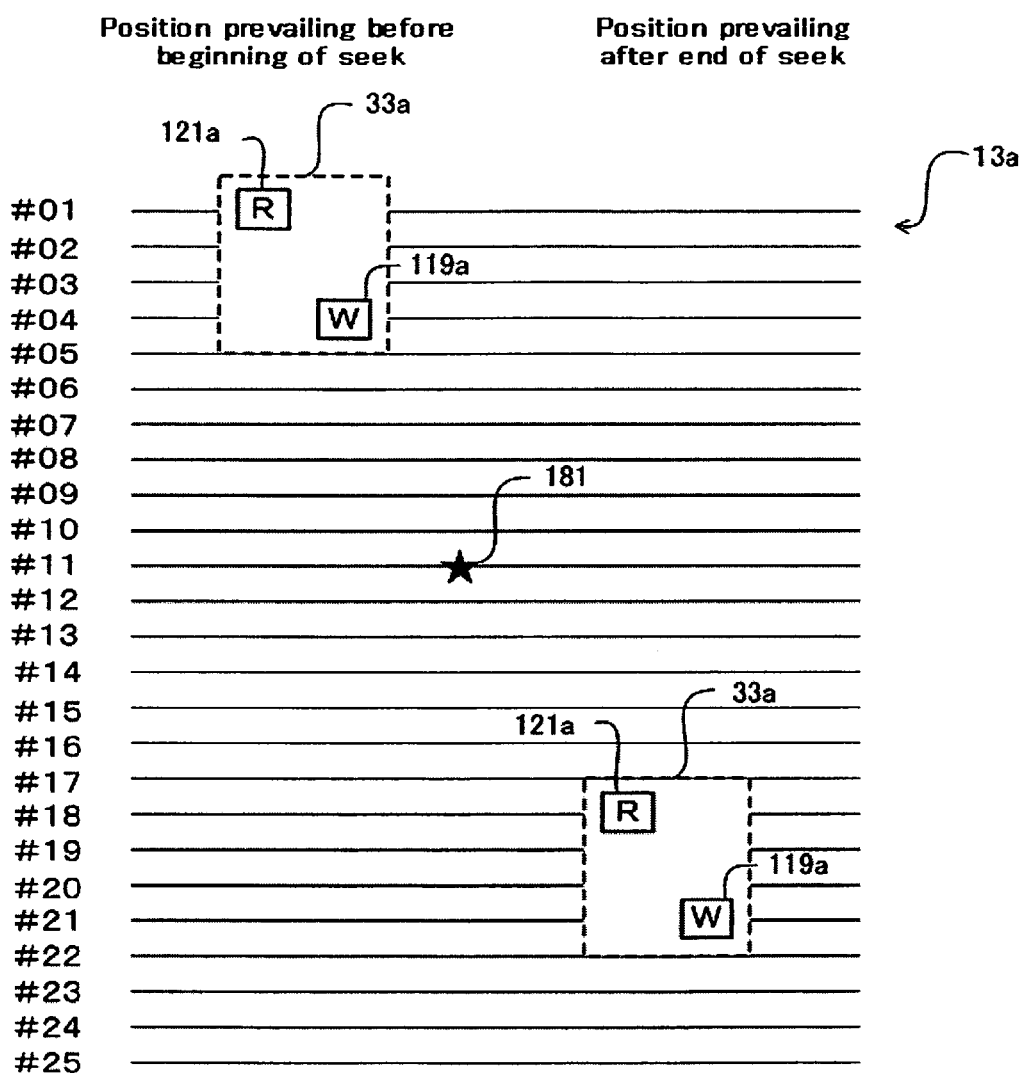
FIG. 11 illustrates the head/slider assembly position and protrusion position that prevail when the sequence indicated in FIG. 10 is followed.

The method for performing a seek operation while avoiding the contact between a protrusion and magnetic head by using the protrusion sector position information, which is registered in the DM of the EEPROM 177, and the operation information, which comprises the integer p and its corrected value and is registered in the control table, will now be described with reference to a flowchart in FIG. 10. FIG. 11 illustrates the head/slider assembly position and protrusion position that prevail when the sequence indicated in FIG. 10 is followed.

As a prerequisite state for step 301, FIG. 11 shows tracks #01 to #25, which are positioned on recording surface 13a, and the positions of head/slider assembly 33a, which prevail before and after the start of a seek operation. To avoid the contact between a protrusion and magnetic head, the MPU 171 executes the FH control program during a seek operation to supply an operating signal to the ACT driver 165 in accordance with the operation information registered in the control table. The ACT driver then applies an operating voltage to the piezoelectric actuator as an operation amount to vary the magnetic head flying height as a control amount. Further, the protrusion inspection process is completed for the recording surfaces of magnetic disks 13 and 15 as indicated in FIG. 9. A protrusion 181 is detected in track #11 on recording surface 13a. The position information and operation information about the protrusion are registered in the EEPROM 177.

As shown in FIG. 7, head/slider assembly 33a includes a read head 121a and a write head 119a. The write head 119a and read head 121a are not over the same track because of the existence of a yaw angle relative to the track tangent, which is generated due to a skew angle peculiar to a rotary actuator. In the example shown in FIG. 7, the read head 121a is positioned over track #01 with the write head 119a positioned over track #04 before the start of a seek operation.

At present, the read head 121a is positioned over track #01 with head/slider assembly 33a flying at the reference flying height. The magnetic disk drive 10 is performing a read operation by reading user data from a data sector that is recorded on track #01, performing a seek operation by reading servo data from the servo sectors on track #01, or performing a write operation by writing user data on track #04.

In step 303, a read command for reading user data on track #18 is received from the host computer. Even if a write command for writing user data onto track #21 is received instead of the read command, head/slider assembly 33a must move the same distance so that the same flying height control is exercised in the present embodiment. In step 305, the MPU 171 examines the protrusion address information registered in the DM of the EEPROM 177 to check for a track that each write head or each read head passes through during a seek operation. More specifically, the MPU 171 checks whether tracks #02 to #20, which the magnetic head passes through during a seek operation, are registered in the DM as protrusion tracks.

If no protrusion track is encountered in step 305 in which each magnetic head passes through the tracks during a seek operation, the flow proceeds to step 309. In step 309, a normal seek operation is performed. More specifically, a seek operation is performed while maintaining the reference flying height. Step 315 is then performed to start a following operation with the read head positioned over track #18. If, in step 305, the position information registered in the DM causes the MPU 171 to recognize that the tracks the magnetic head passes through during a seek operation include protrusion track #11 on recording surface 13a, the flow proceeds to step 307.

The MPU 171 does not send an operating signal to the VCM driver 163 but causes the carriage assembly 21 to begin a seek operation from cylinder #01 to cylinder #18 while maintaining the reference flying height. The MPU 171 supplies an operating signal to the ACT driver 165, thereby exercising control to increase the flying height immediately before the magnetic head passes through protrusion track #11 and reset the flying height to the reference flying height immediately after the magnetic head passes through protrusion track #11. When, in the present embodiment, the MPU 171 reads the servo data on each track during a seek operation and recognizes that the read head 119a has reached track #10, which immediately precedes protrusion track #11, the MPU 171 generates an operating signal with the integer p and its corrected value for the protrusion 181 registered in the EEPROM 177 and supplies the generated operating signal to the ACT driver 165. The ACT driver 165 applies an operating voltage to piezoelectric actuator 41a to increase the flying height until it is greater than the reference flying height by a predetermined value.

Before the write head 119a reaches track #10, the servo data read capacity does not decrease because head/slider assembly 33a flies at the reference flying height. The operating signal value is determined in accordance with the operation information that is registered to provide a minimum flying height value for preventing the write head 119a and read head 121a from coming into contact with the protrusion 181. Therefore, the contact between a magnetic head and protrusion 181 can be avoided without increasing the flying height beyond necessity.

After it is recognized from the servo data that the read head 121a has passed through protrusion track #11 and that head/slider assembly 33a does not possibly come into contact with the protrusion, the MPU 171 stops supplying the operating signal to the ACT driver 165 so that the flying height of head/slider assembly 33a reverts to the reference flying height. When the ACT driver 165 decreases the operating voltage applied to piezoelectric actuator 41a to zero, the flying height of head/slider assembly 33a reverts to the reference flying height in step 313. The remaining portion of the seek operation is then performed. In step 315, a following operation for track #18 begins.

The increased flying height is generated in accordance with the operation information that is registered to provide a minimum value required for preventing the magnetic head 33a from colliding against the protrusion. Therefore, only a small amount of time is required for the flying height to vary between the reference flying height and increased flying height. Thus, the number of tracks that the read head passes through while the flying height is increased need not be large. From the relationship between the move speed of the head/slider assembly during a seek operation and the response time of piezoelectric actuator, the present embodiment assumes that the MPU 171 transmits the operating signal to the ACT driver 165 in order to avoid the contact with the protrusion by increasing the flying height when a track that immediately precedes the protrusion track is encountered. The present embodiment also assumes that the operating signal transmission is stopped immediately after the magnetic head passes through the protrusion track. When safety is considered, the operating signal may be transmitted when a track that precedes the protrusion track by more than one track is encountered. At a position at which the flying height is increased, the read head's capacity for reading the servo data decreases. In reality, however, protrusion tracks do not exist consecutively in the radial direction. Therefore, there is no problem with servo control.

Since track #11 on recording surface 13a is the only one protrusion track, the operating voltage is not applied to the other piezoelectric actuators 41b, 41c, 41d so that head/slider assemblies 33b, 33c, and 33d fly at the reference flying height during a seek operation. The first contact between the protrusion and head/slider assembly may occur at the read head depending on the yaw angle and the direction of magnetic head move. In such an instance, however, the operating signal is generated with reference to the read head position. If the read head is larger than the write head, the operating signal supply/stop timing may be determined with reference to the read head position only. If a head/slider assembly part other than the magnetic head may come into contact with the protrusion, the operating signal supply/stop timing may be determined with reference to the position of such a part. The timing with which the MPU 171 supplies the operating signal to the ACT driver 165 in order to increase the flying height for passing through the protrusion track may be acquired by making use of the elapsed time from the beginning of a seek operation. In such an instance, the MPU 171 calculates, at the beginning of a seek operation, the time t required for head/slider assembly 33a to move from the current track #01 to a position immediately before the protrusion track #11 in accordance with the number of tracks between tracks #01 and #11. Alternatively, the MPU 171 may reference a table that is prepared to define the relationship between the time t and the number of tracks between the current track #01 and protrusion track #11.

Following Operation Method

The method for performing a following operation while avoiding the contact between a protrusion and magnetic head by using the protrusion sector position information, which is registered in the DM of the EEPROM 177, and the operation information, which is registered in the control table of the EEPROM 177, will now be described with reference to a flowchart in FIG. 12. In a following operation, the speed of the magnetic head relative to the magnetic disk is higher than in a seek operation. It is therefore necessary to consider the piezoelectric actuator control system's response time for an interval between the instant at which the operating voltage is applied and the instant at which the flying height is increased as needed to avoid the contact with a protrusion and for an interval between the instant at which the flying height is increased and the instant at which the flying height reverts to the reference flying height.

Figure 12:
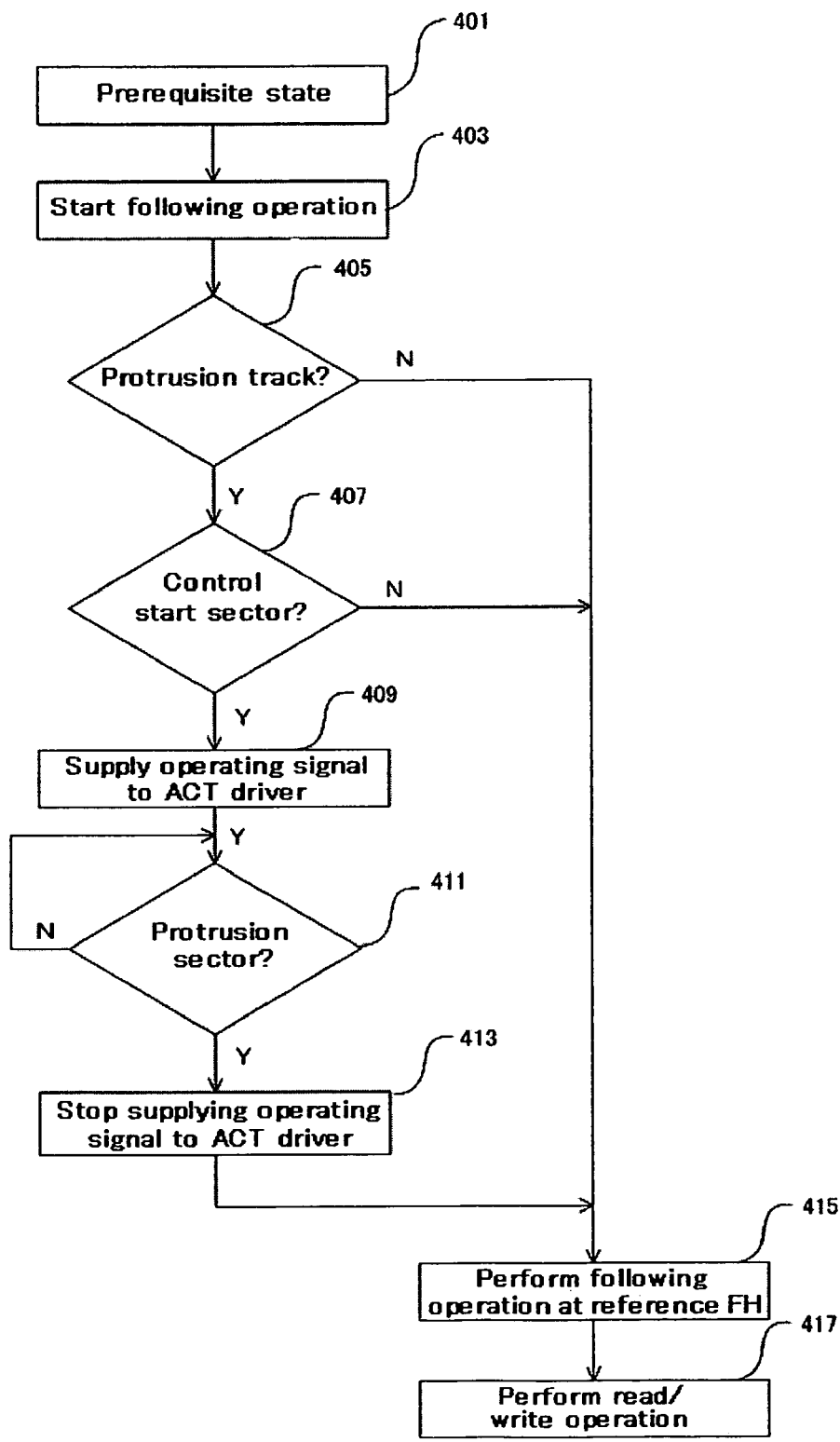
FIG. 12 is a flowchart illustrating a sequence for preventing a magnetic head from colliding against a protrusion during a following operation.
Figure 13:
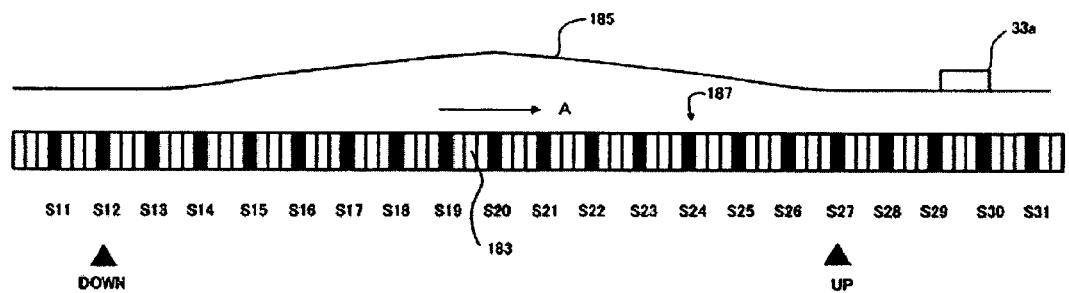
FIG. 13 illustrates how flying height control is exercised during a following operation.

FIG. 13 illustrates the relationship between the head/slider assembly flying height and protrusion that prevails when the sequence indicated in FIG. 12 is followed. FIG. 13 shows servo sectors S11 to S31, which are on a target track 187 on recording surface 13a, and three data sectors positioned between the servo sectors. As the magnetic disk 13 rotates, the target track 187 moves in the direction of arrow A, and head/slider assembly 33a flies over the target track 187. A protrusion exists in data sector 183. Servo sector S20 on which data sector 183 is dependent is registered in the DM of the EEPROM 177 as a protrusion sector. Further, seven consecutive servo sectors S13 to S19 and S21 to S27 on either side of the protrusion sector S21 are registered in the DM of the EEPROM 177 as defective sectors.

Therefore, data sectors dependent on servo sectors S13 to S27 are disabled and no user data is written in such data sectors. To indicate the relative positional relationship between the moving track 187 and the flying but stationary head/slider assembly 33a, it is possible to conceive that head/slider assembly 33a moves in a direction opposite to the direction of arrow A while the target track 187 is stopped. The flying height of head/slider assembly 33a prevailing in such an instance is indicated by line 185.

In a prerequisite state for step 401, the MPU 171 executes the FH control program during a following operation to avoid the contact between a protrusion and magnetic head, sends an operating signal, which is generated in accordance with the operation information registered in the control table of the EEPROM 177, to the ACT driver 165, and allows the ACT driver 165 to apply an operating voltage to the piezoelectric actuator as an operation amount and vary the magnetic head flying height as a control amount. Further, the sequence indicated in FIG. 9 is followed to complete the protrusion inspection for all recording surfaces of magnetic disks 13 and 15. The EEPROM 177 is used to register the position information, which comprises the cylinder address, sector address, and head number of a protrusion that is detected on each recording surface, and the operation information, which comprises the integer p and its corrected value. Further, a read command is transmitted from the host computer so that a seek operation is completed for a track having a specified address. Therefore, the magnetic disk drive is about to start a following operation.

In step 403, the read head 121a reaches the target track 187, and the servo control system switches from the speed control mode to the position control mode so that a following operation begins. In a following operation, an operating signal is supplied to the VCM driver 163 so that the MPU 171 places the read head 121a at the center of the target track 187 in accordance with the PES, which is generated by the servo controller from a burst signal for a servo data read. At the position indicated in the figure, head/slider assembly 33a is flying at the reference flying height.

In step 405, the MPU 171 references the DM in the EEPROM 177 to judge whether the target track 187 is a protrusion track. The target track includes a track over which the read head is positioned and a track over which the write head is simultaneously positioned. More specifically, if the read head 121a and write head 119a are positioned over different tracks due to the yaw angle, the MPU 171 judges whether the read head 121a and write head 119a are over protrusion tracks. If the target track 187 over which the read head 121a is positioned and a target track over which the write head is positioned are not protrusion tracks, the flow proceeds to step 415. In step 415, a following operation is performed while the magnetic heads are flying at the reference flying height. When the track positional error calculated according to the PES is within a predetermined range, a data read or data write operation is performed in step 417.

If it is judged in step 405 that the target track 187 for the read head 121a is a protrusion track, the flow proceeds to step 407. In step 407, the MPU 171 reads the sector address of each servo sector and judges whether each servo sector passing through the read head 121a is a control start sector S27. The control start sector S27 is set in the DM with a flag and is the first servo sector S27 of a predetermined number of consecutive servo sectors that are registered as defective servo sectors and arrayed in the direction of rotation from the protrusion sector. When the read head 121a detects the sector address of the control start sector S27, the MPU 171 uses the operation information registered in the control table to generate an operating signal for the ACT driver 165, and supplies the generated signal to the ACT driver 165.

Upon receipt of the operating signal, the ACT driver 165 applies an operating voltage to piezoelectric actuator 41a. The flying height of head/slider assembly 33a then gradually increases from the reference flying height in accordance with the response time of piezoelectric actuator 41a. When a predetermined period of time elapses after the control start sector S27 passes through the read head 121a, the MPU 171 stops supplying the operating signal to the ACT driver 165 (step 411). The predetermined period of time is equivalent to the time interval between the instant at which the control start sector S27 passes through the read head 121a and the instant at which the protrusion sector S20 reaches the read head 121a.

When the protrusion sector S20 reaches the read head 121a, the flying height of the read head 121a is maximized as defined by the operation information. Although the read head 121a may not be able to read the sector address of the protrusion sector S20, the timing with which the protrusion sector S20 passes through the read head 121a can be acquired by measuring the elapsed time from the instant at which the control start sector S27 passes through the read head 121a. The timing with which the MPU 171 stops supplying the operating signal to the ACT driver 165 may be acquired by using a sector address that is read from servo sector S21 or S22, which are positioned before the protrusion sector S20. The flying height of head/slider assembly 33a becomes maximized at the position of the protrusion sector S20 and then begins to decrease. At the position of servo sector S13, the flying height of head/slider assembly 33a reverts to the reference flying height. Line 185 indicates how the flying height changes in such an instance.

Data sectors dependent on servo sectors S13 to S27 are not used for user data recording purposes. Therefore, even if the magnetic head flying height increases while a servo sector between S13 and S27 is encountered, the magnetic disk drive performance remains unaffected. Further, the flying height at servo sector S20 depends on the operation information that is registered to provide a minimum value for avoiding the contact between a protrusion and magnetic head. Therefore, a servo data read is difficult at only one servo sector, which is placed at a position at which the flying height is maximized. Consequently, a following operation remains unaffected. The number of servo sectors S13 to S27 is several percent of all servo sectors positioned within one track. Therefore, the user can use data sectors dependent on the remaining servo sectors (servo sectors S12 and beyond), thereby maintaining an adequate storage capacity.

Typical flying height control exercised during read command execution has been described above. While a write command is being executed, a write operation can be performed in the same manner as described above while avoiding the contact between a protrusion and write head. In the present embodiment, seven consecutive servo sectors on either side of the protrusion sector S20 are registered as defective servo sectors. However, the number of servo sectors to be registered as defective ones should be minimized to avoid a decrease in the magnetic disk storage capacity. It is therefore preferred that an optimum number of servo sectors be selected as defective ones in accordance with the magnetic disk rotation speed and piezoelectric actuator response time. When a quick-response flying height control mechanism is employed, it is possible to decrease the number of servo sectors to be registered as defective ones.

Another Seek Operation Method

Another seek operation method will now be described. If, in the sequence indicated in FIG. 10, the magnetic head passes through a protrusion track during a seek operation, the flying height is increased at the position of the protrusion track without judging whether the magnetic head may come into contact with a protrusion. In reality, two or more protrusions rarely coexist in the same track. Therefore, even when the magnetic head moving at the reference flying height passes through the protrusion track during a seek operation, it may not come into contact with a protrusion.

Figure 14:
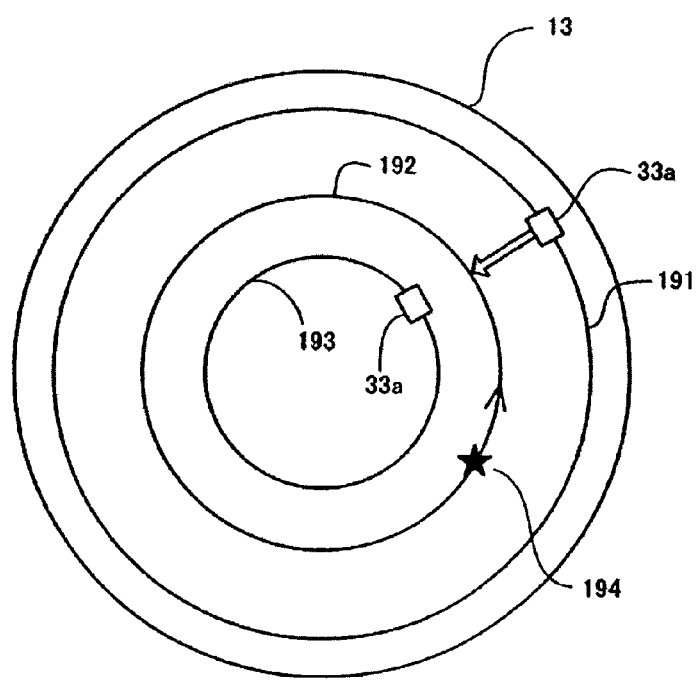
FIG. 14 illustrates a method for judging whether a magnetic head may come into contact with a protrusion during a seek operation.

A situation where head/slider assembly 33a is currently positioned over track 191 and a seek operation is performed to reach a target track 193, as indicated in FIG. 14, in compliance with a read/write command, which is issued by the host computer, will now be described. There is a protrusion track 192 between the current track 191 and target track 193. A protrusion 194 exists in the protrusion track 192. At the beginning of a seek operation, the MPU 171 calculates the time t required for head/slider assembly 33a to move from the current track 191 to the target track 192 in accordance with the number of tracks existing between the current track 191 and target track 192. Alternatively, the MPU 171 may reference a table that is prepared to define the relationship between the time t and the number of tracks between the current track and target track.

Next, the position of the protrusion 194 that prevails when the time t elapses is calculated from the protrusion position prevailing at the beginning of a seek operation and the rotation speed of the magnetic disk 13. Further, calculations are performed to judge whether the magnetic head may come into contact with the protrusion 194. If the calculation result indicates that the protrusion 194 is positioned beneath head/slider assembly 33a when the time t elapses after the start of a seek operation, the MPU 171 generates an operating signal as indicated in FIG. 10 and supplies the generated operating signal to the ACT driver 165. If, on the other hand, the calculation result indicates that the protrusion 194 is not positioned beneath head/slider assembly 33a, the MPU 171 does not supply the operating signal to the ACT driver 165, but completes the seek operation while maintaining the reference flying height. When control is exercised in this manner, unnecessary flying height adjustments can be avoided.

Figure 15:
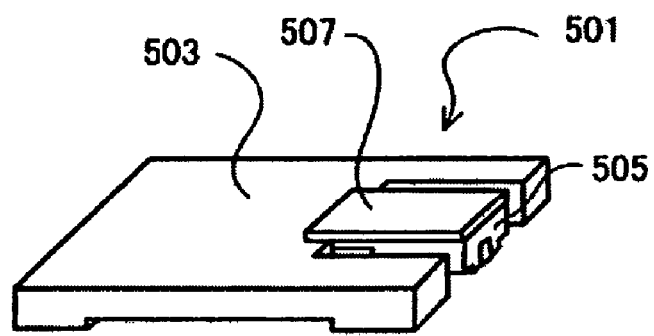
FIGS. 15(A) and 15(B) are external views illustrating a head/slider assembly on which a piezoelectric actuator is mounted.
Figure 15:
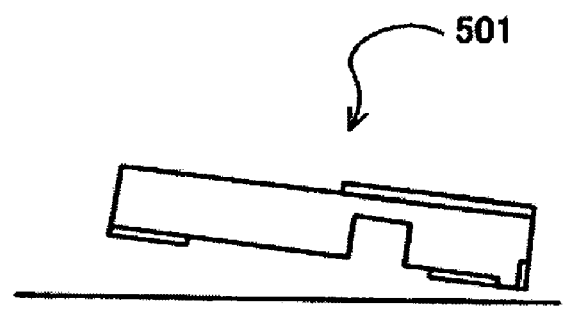
Figure 15:
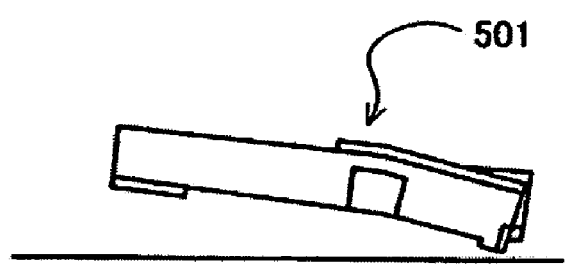

The present embodiment assumes that the piezoelectric actuator is mounted on the load beam of the HGA. Alternatively, however, the piezoelectric actuator may be mounted on the head/slider assembly as described in Patent Document 1. FIGS. 15(A) and 15(B) are external views illustrating a head/slider assembly with a piezoelectric actuator that is described in Patent Document 1. As shown in FIG. 15(A), the head/slider assembly 501 includes a parent slider 503 and a child slider 505. A piezoelectric actuator 507 is attached to these sliders. When a voltage is applied to the piezoelectric actuator 507, the child slider becomes displaced so as to change the flying height shown in FIG. 15(B). Another method for changing the magnetic head flying height is disclosed by Japanese Patent Laid-Open No. 168274/2003. When this method is employed, a heater current is supplied to two heaters, which are embedded in the head/slider assembly, to variously change the write head and read head thermal expansion amounts, thereby controlling the flying height. In this instance, the heaters constitute a flying height control mechanism.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
   a magnetic disk on which a plurality of tracks are defined;
   a head/slider assembly that includes a magnetic head for accessing said magnetic disk;
   a head support mechanism configured to support said head/slider assembly;
   a flying height (FH) control mechanism configured to control the flying height of said magnetic head;

a recording medium that registers the position information about a protrusion on the surface of said magnetic disk and the operation information about the amount of FH control mechanism operation required for controlling said flying height to prevent said magnetic head from coming into contact with said protrusion; and a processor that references said position information and said operation information and controlling said FH control mechanism to prevent said magnetic head from coming into contact with said protrusion;

wherein said processor controls said FH control mechanism for allowing said head support mechanism to start a seek operation at a reference flying height from the current track to a target track, causing said flying height to increase above said reference flying height before said magnetic head passes through a track containing said protrusion, and resetting said flying height to said reference flying height after said magnetic head passes through a track containing said protrusion;

wherein, when a predetermined period of time elapses after the start of a seek operation, said processor supplies an operating signal according to said operation information to said FH control mechanism.

2. The magnetic disk drive according to claim 1, wherein said processor reads the address information about servo sectors that constitute said plurality of tracks and supplies an operating signal according to said operation information to said FH control mechanism when a track preceding a track containing said protrusion by a predetermined number of tracks is reached.

3. The magnetic disk drive according to claim 1, wherein said processor controls said FH control mechanism for allowing said head support mechanism to perform a following operation in relation to a track containing said protrusion at a reference flying height, causing said flying height to increase above said reference flying height before said protrusion passes through said magnetic head, and resetting said flying height to said reference flying height after said protrusion passes through said magnetic head.

4. The magnetic disk drive according to claim 3, wherein said processor supplies an operating signal according to said operation information to said FH control mechanism when said magnetic head is reached by a servo sector that precedes a servo sector on which a data sector containing said protrusion is dependent by a predetermined number of servo sectors.

5. The magnetic disk drive according to claim 3, further comprising a defect registration map in which a predetermined number of servo sectors positioned on both sides of a servo sector on which a data sector containing said protrusion is dependent are registered as defective sectors.

6. The magnetic disk drive according to claim 1, wherein said FH control mechanism includes a piezoelectric element that is mounted on a load beam of a head gimbal assembly.

7. The magnetic disk drive according to claim 1, wherein said FH control mechanism includes a piezoelectric element that is mounted on said head/slider assembly.

8. The magnetic disk drive according to claim 1, wherein said FH control mechanism includes a heater that is incorporated in said head/slider assembly to control the thermal expansion amount of said magnetic head.

9. A control method for controlling the flying height of a magnetic head in a magnetic disk drive that is equipped with a flying height (FH) control mechanism for controlling the flying height of said magnetic head, the control method comprising:

supplying the position information about a protrusion on the surface of a magnetic disk and the operation information about the amount of FH control mechanism operation required for controlling said flying height to prevent said magnetic head from coming into contact with said protrusion;

staffing a seek operation at a reference flying height; and controlling said FH control mechanism in accordance with said position information and said operation information to let said flying height increase above said reference flying height before said magnetic head passes through a track containing said protrusion during said seek operation and reset said flying height to said reference flying height after said magnetic head passes through the track containing said protrusion;

wherein controlling said FH control mechanism includes controlling said FH control mechanism in accordance with said operation information so that said flying height increases when a predetermined period of time elapses after the start of a seek operation.

10. The control method according to claim 9, wherein controlling said FH control mechanism includes maintaining said reference flying height when said magnetic head passes through said protrusion in accordance with the time interval between an instant at which said seek operation begins and an instant at which said magnetic head moves to a track in which said protrusion exists and with the position of said protrusion that prevails when said seek operation begins.

11. The control method according to claim 9, further comprising controlling said FH control mechanism in accordance with said position information and said operation information to let said flying height increase above said reference flying height before said protrusion passes through said magnetic head and reset said flying height to said reference flying height after said protrusion passes through said magnetic head.

12. The control method according to claim 11, further comprising controlling said FH control mechanism in accordance with said position information and said operation information to let said flying height begin increasing when a servo sector preceding a servo sector on which a data sector containing said protrusion is dependent by a predetermined number of servo sectors reaches said magnetic head, which flies at a reference flying height.

13. The control method according to claim 11, further comprising allowing said flying height to begin decreasing when a predetermined period of time elapses after the start of flying height increase.

14. A manufacturing method for manufacturing a magnetic disk drive that is provided with a flying height (FH) control mechanism for controlling the flying height and a reference table that can be referenced by a processor, the manufacturing method comprising:

writing test data onto a magnetic disk;

flying a magnetic head at a reference flying height to read said test data;

detecting the contact between said magnetic head and a protrusion on said magnetic disk in reading said test data and registering the position information about said protrusion in said reference table;

registering in said reference table the operation information about the amount of FH control mechanism operation required for preventing said magnetic head from coming into contact with said protrusion; and registering as defective servo sectors a predetermined number of servo sectors positioned on both sides of a servo sector on which a data sector containing said protrusion is dependent;

wherein said magnetic head includes an MR read head or a GMR read head; and wherein registering said operation information in said reference table includes gradually increasing said flying height from a reference flying height by supplying an operation amount, which varies in unit operation amount increments, to said FH control mechanism and detecting a thermal asperity that is caused by the contact between said protrusion and said MR read head or said GMR read head.

15. The manufacturing method according to claim 14, wherein said magnetic head includes an MR read head or a GMR read head; and wherein registering said operation information in said reference table includes gradually decreasing said flying height from a value that does not incur a thermal asperity by supplying an operation amount, which varies in unit operation amount increments, to said FH control mechanism and detecting the occurrence of a thermal asperity.

* * * * *

UNITED STATES PATENT AND TRADEMARK OFFICE
CERTIFICATE OF CORRECTION

PATENT NO.        : 7,457,069 B2                                      Page 1 of 1
APPLICATION NO.   : 11/372064
DATED             : November 25, 2008
INVENTOR(S)       : Yoshioka et al.

It is certified that error appears in the above-identified patent and that said Letters Patent is hereby corrected as shown below:

Claim 9, column 22, line 8, the word "staffing" please change to --starting--

Signed and Sealed this

Seventeenth Day of February, 2009

JOHN DOLL
*Acting Director of the United States Patent and Trademark Office*